Figure 1:
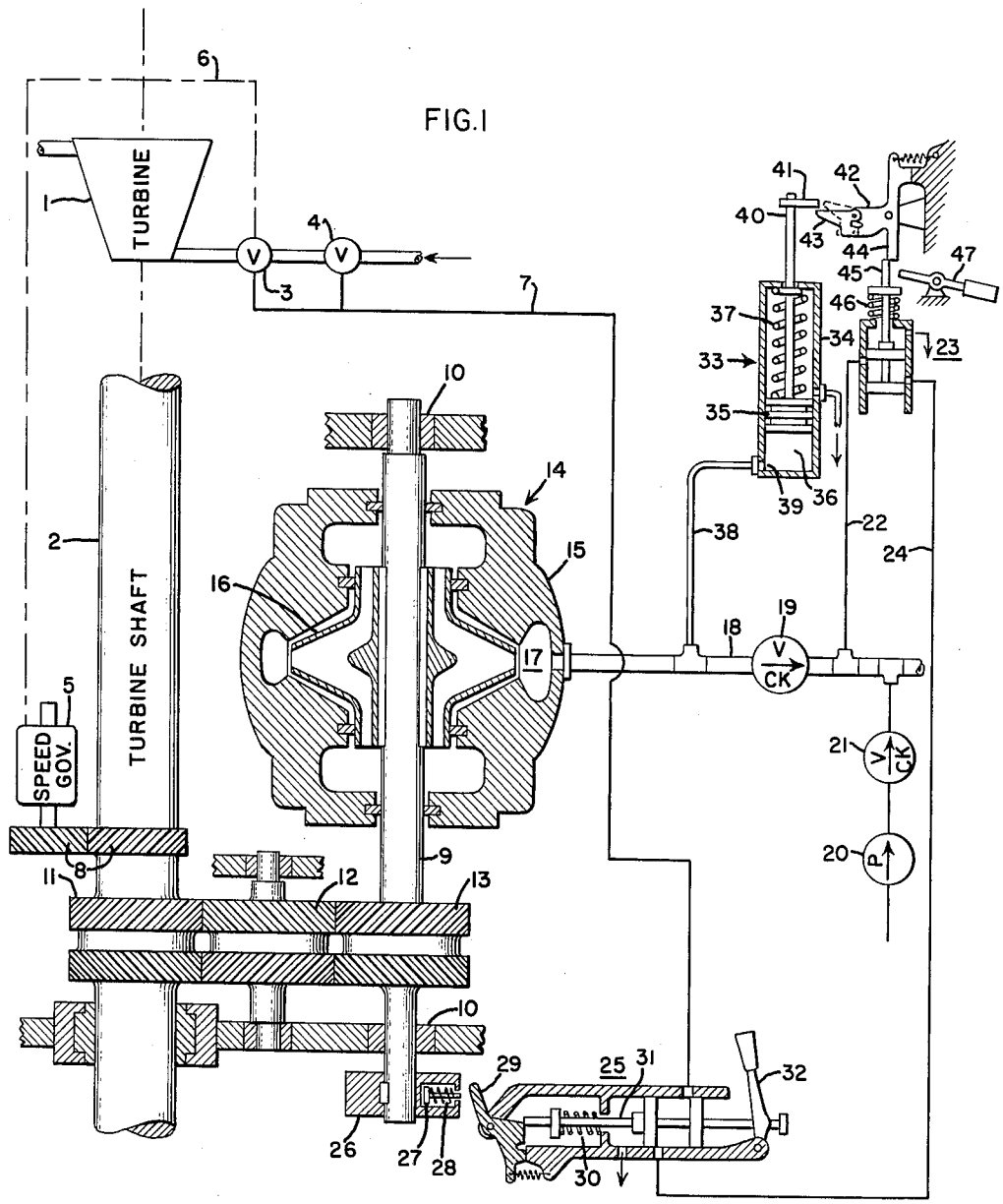

Oct. 12, 1965   R. L. CARSON ETAL   3,211,957
PROTECTIVE DEVICE FOR A PRIME MOVER HAVING
AN OVERSPEED GOVERNOR
Filed March 29, 1963   2 Sheets-Sheet 1

INVENTORS:
ROBERT L. CARSON,
PETER G. IPSEN,
BY   W. C. Crutcher
THEIR ATTORNEY.

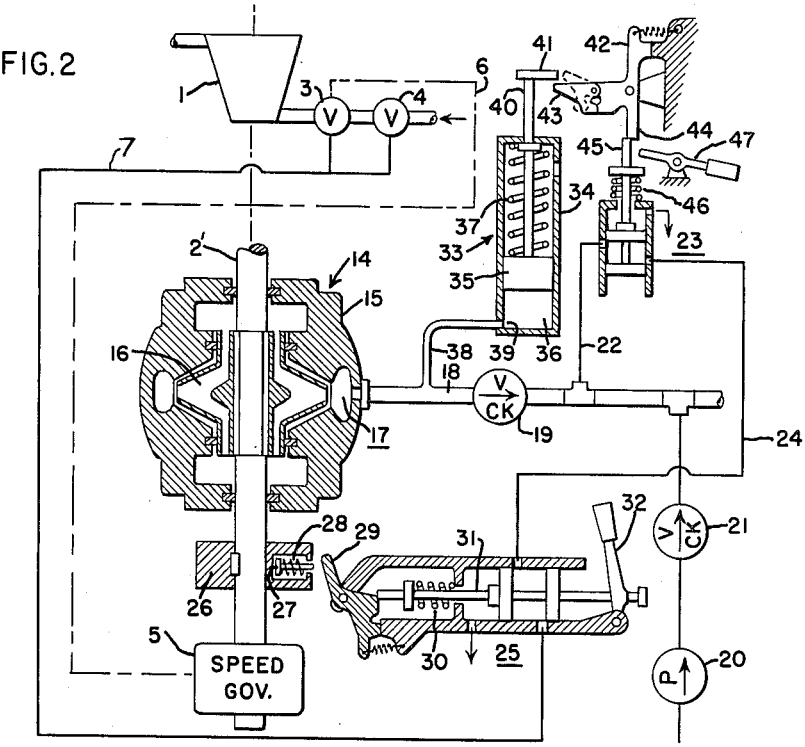
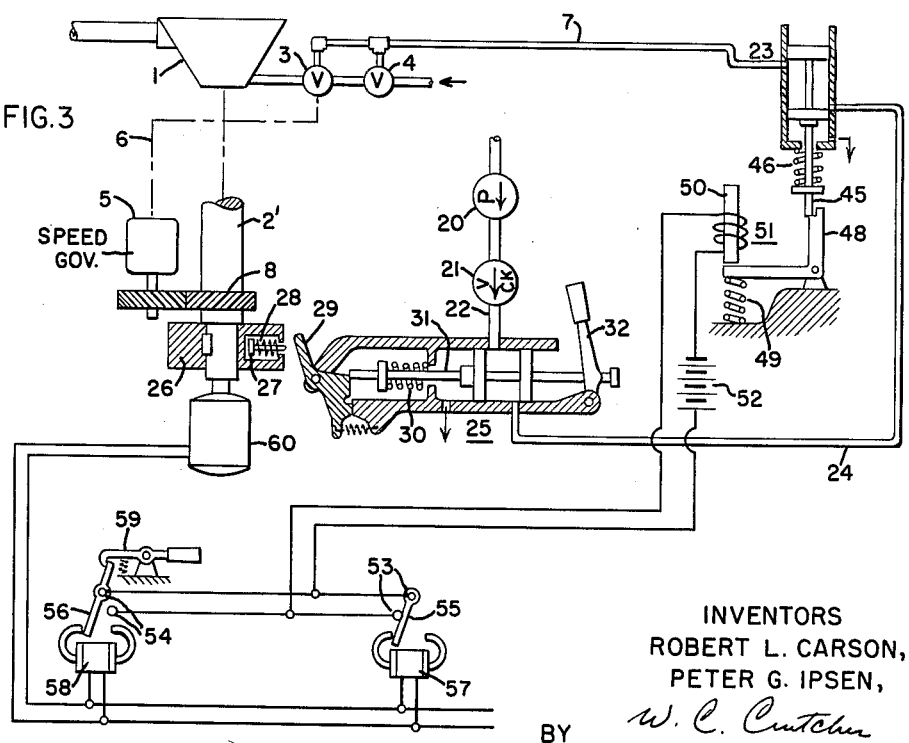

United States Patent Office 3,211,957
Patented Oct. 12, 1965

3,211,957
PROTECTIVE DEVICE FOR A PRIME MOVER HAVING AN OVERSPEED GOVERNOR
Robert L. Carson, Scotia, and Peter G. Ipsen, Schenectady, N.Y., assignors to General Electric Company, a corporation of New York
Filed Mar. 29, 1963, Ser. No. 269,045
8 Claims. (Cl. 317—19)

This invention relates to an arrangement for improving the reliability of a prime mover having a governor arranged to shut down the prime mover in the event of overspeed. More particularly, the invention relates to a device for shutting down the prime mover, in the event there is a mechanical failure of the shaft or coupling by which the emergency governor is driven, so that the governor is no longer reflecting the true speed of the prime mover.

In the case of a steam turbine, it is normal practice to provide two independent speed-sensitive means for shutting off energy flow to the turbine in case the speed rises above a safe value. One of these is the "speed or load governor," which operates the turbine "control valves" under normal conditions. The other is an "emergency governor" which operates quick closing "stop valves." However, the speed governor and the emergency governor must be driven either by the main shaft or by an auxiliary shaft mechanically coupled to the main shaft. Mechanical failure of the driving means for either or both of the speed-sensitive devices is possible, even though the driving means is ordinarily quite reliable.

However remote the possibility of failure of the speed-sensitive driving means, failure of the driving means can place the turbine in serious jeopardy and such a possibility decreases the over-all reliability of the power plant.

Accordingly, one object of the present invention is to provide a protective device to shut off energy flow to an operating turbine, in the event that the means driving one or more of the speed-sensitive devices protecting the turbine against overspeed should fail.

Another object of the invention is to provide an arrangement for increasing the reliability of a speed governor which is driven by a prime mover either from an extension of the main shaft or from an auxiliary shaft mechanically coupled to the main shaft.

Still another object of the invention is to provide a protective device for increasing the reliability of a turbine emergency overspeed governor in the event that the overspeed governor no longer reflects the true turbine speed.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing, in which:

FIG. 1 is a schematic view, partly in section, of the protective device as applied to an emergency speed governor driven from an auxiliary shaft coupled to the turbine shaft, FIG. 2 is a schematic view, similar to FIG. 1, but wherein the speed-sensitive devices are driven from an extension of the main turbine shaft, and, FIG. 3 is a modified form of the invention, in schematic, employing a slightly different type of protective device.

Briefly stated, the invention is practiced by providing an additional speed-responsive device, which is disposed in such close proximity to the speed-responsive device it is intended to protect, that mechanical failure of the shaft portion between them is extremely unlikely. This additional speed-responsive device is caused to be disabled or inoperative until a predetermined speed is reached, whereupon it is arranged to shut off energy to the prime mover if it falls below this predetermined speed.

Referring now to FIG. 1 of the drawing, a prime mover such as a turbine 1, has a main shaft 2, and is controlled by admission of steam through the control valves 3, and the stop valves 4. Normal operation of control valve 3 is effected by means of the speed governor 5, as indicated by dot-dash line 6. The details of this control are immaterial to the present invention, and it may be mechanical, hydraulic, or electrical.

Emergency closure of control valves 3 and stop valves 4 is effected by means of a hydraulic line 7, in which pressure is maintained during normal operation. Dumping of the oil from line 7 causes valves 3, 4, to close quickly, according to devices well known in the art.

Speed governor 5 is mechanically coupled to the main turbine shaft 2 by means of gears 8. A separate auxiliary shaft 9, journalled in bearings 10, is disposed alongside turbine shaft 2. Shaft 9 is mechanically coupled to shaft 2 by means of a gear 11 on shaft 2, an idler gear 12, and a gear 13 on shaft 9. As shown, gears 11 and 13 are of the same pitch diameter so that shaft 9 is rotated at the same speed as shaft 2, but this is not necessary in the practice of the invention. Also, other types of gear trains or coupling means connecting shafts 2, 9, might be employed such as spline teeth, chain drives, clutches, etc.

Although the gear train 11, 12, 13 shown is ordinarily extremely reliable, the possibility of gear failure or of failure of main shaft 2 between the turbine and the gears, decreases the over-all reliability of the power plant, since such failure would result in shaft 9 no longer reflecting the turbine speed.

Receiving power from shaft 9 is a centrifugal shaft pump 14, which is a conventional auxiliary device in turbine power plants used for supplying lubricating oil, control oil, etc. It includes a stator member 15, and an impeller 16, mounted on shaft 9. The pump discharge chamber 17, supplies oil through pipe 18 and check valve 19, for various auxiliary purposes. Additional supplementary sources of oil under pressure may be furnished to line 18, as indicated by pump 20 and check valve 21. It will, of course, be undertsood that the property of a centrifugal pump such as pump 14 is that the outlet pressure in chamber 17 varies roughly as the square of the speed of shaft 9.

The hydraulic pressure in line 7 is maintained by means of a hydraulic line 22 connected to line 18 on the outlet side of check valve 19. The oil passes through a dump valve shown generally as 23, hydraulic line 24, and a second dump valve shown generally as 25. Ports in the walls of dump valves 23, 25, allow the pressure in line 18 to be maintained in hydraulic line 7 under normal conditions, i.e. when the dump valve stems are disposed as shown in the drawing. Tripping of either dump valve 23, 25, will cause the pressure in line 7 to drop and causes emergency closure of valves 3, 4.

Dump value 25 is a conventional device operated by an emergency overspeed governor 26, also disposed on auxiliary shaft 9. Emergency governor 26 is a very reliable known type, and includes an off-center weight 27 biased radially inward toward shaft 9 by a spring 28. Upon the speed of shaft 9 exceeding a predetermined value (which usually indicates that speed governor 5 has failed to adequately reduce steam flow) the plunger of off-center weight 27 will move outward to strike a pivotable trip lever 29 on the dump valve 25. A compression spring 30 will thereupon drive pilot valve 31 to the left, dumping oil in line 7. A reset handle 32 is provided and may later be used to reset the valve stem 31 after tripping has occurred. All of the foregoing represents conventional apparatus for overspeed protection, where the emergency governor and shaft pump are driven by an auxiliary shaft mechanically coupled to the main shaft.

According to the present invention, the means for protecting the turbine against failure of either shaft 2 or gear members 11, 12, 13, includes an additional speed responsive device for actuating the dump valve 23. The speed-responsive signal is obtained by appropriate utilization of the speed-responsive properties of the outlet oil pressure from shaft pump 14 in the following manner. A pressure-responsive device, shown generally as 23, includes a cylinder 34, with a piston 35 therein. Piston 35 is spring-biased toward a pressure chamber 36 by a compression spring 37. A small pipe 38 provides access of fluid from pipe 18 to the pressure chamber 36 through port 39. Disposed on a stem extension 40 of piston 35, is an abutment 41. Abutment 41 cooperates with a pivotable trip lever 42, having a hinged extension 43. A trip finger 44 on lever 42, prevents the stem 45 of dump valve 23, from rising under the influence of a compression spring 46.

Dump valve 23 is only tripped after abutment 41 has risen to its upward position shown, this being enabled by pivoting of the hinged extension 43. Thereafter, downward movement of abutment 41 will rotate lever 42 counterclockwise, disengaging finger 44, and allowing stem 45 to rise and dump oil from lines 24, 7. A reset handle 47 is used to reset the dump valve 23 after it has tripped. It will be observed from the foregoing that the dump valve is disabled or inoperative during upward movement of abutment 41 and only can be actuated upon subsequent downward movement of abutment 41.

The operation of the arrangement of FIG. 1 is as follows. Emergency governor 26 acts as a very reliable speed responsive device to operate dump valve 25 and shut down turbine 1 when a predetermined speed is exceeded (assuming that speed governor 5 has failed to control turbine speed). However, the presence of intervening members between turbine 1 and governor 26, such as coupling members 11, 12, 13, introduces the possibility that auxiliary shaft 9 may cease rotating because of failure of these intervening members while turbine 1 is still turning and perhaps entering a serious overspeed condition. In this event, the emergency overspeed governor 26 would be rendered inoperative, even though it would otherwise be highly reliable.

For this reason, the pump 14 is employed in a secondary role as an additional speed-responsive device, though its primary function is to furnish auxiliary oil. As the speed of the turbine shaft 2 and auxiliary shaft 9 increase, the increased pump outlet pressure in chamber 17 is communicated to pressure chamber 36, causing piston 35 to rise against the force of spring 37. Abutment 41 will rise until, as a predetermined turbine speed is exceeded, it will pass beyond the hinged extension 43. If the shaft 2 or coupling gears 11, 12, 13, then fail, shaft 9 will decelerate, and the discharge pressure of pump 14 will decrease. The pressure in chamber 36 will drop, possible flow of other auxiliary oil from pump 20 into chamber 36 being prevented by check valve 19. Abutment 41 will descend and rotate lever 42 counterclockwise to trip the dump valve 23, closing main steam valves 3, 4. Thus, the shaft pump 14 performs the additional function of acting as a supplementary speed-responsive device which shuts down the turbine when shaft 9 commences to slow down after it has first reached a predetermined minimum speed.

FIG. 2 of the drawing shows an arrangement similar to FIG. 1, except that the shaft pump 14 and emergency governor 26 are driven from a main shaft extension 2′ rather than from an auxiliary shaft coupled to the main shaft. The shaft extension 2′ is either a part of the turbine shaft or it may be a part of a generator shaft driven by the turbine. The same reference numbers employed in FIG. 1 are used in FIG. 2 for identical components.

The shaft pump 14 and emergency governor 26 are often driven directly from a main shaft extension as shown in FIG. 2, when the shaft diameter so permits. The use of an auxiliary shaft, such as shown in FIG. 1, is sometimes necessary when the main shaft diameter is so large as to make it difficult or impossible to design a suitable shaft pump impeller or a suitably sized emergency governor. In FIG. 2, however, shaft pump 14, emergency governor 26, and speed governor 5, are all shown mounted on the smaller diameter main shaft extension 2′. Even though no mechanical coupling means are shown, there is yet the possibility of failure of shaft 2′ near turbine 1. In this event, none of the speed-responsive devices 5, 26 would reflect the speed of turbine 1, which could overspeed without its normal overspeed protection.

Due to the relatively low net torque required to be transmitted between the closely located members 14, 26, 5, failure of the short shaft portions between speed governor 5, emergency governor 26 and shaft pump 14, is extremely improbable. Accordingly, shaft pump 14 is employed as an auxiliary speed-responsive device as before.

The operation is exactly the same as described in connection with FIG. 1. Tripping of dump valve 23 cannot occur until the turbine speed has first risen above a predetermined minimum value and then only upon subsequent slowing down of shaft pump 14. Hence, the additional protective device prevents the possibility of governors 26, 5, slowing down and failing to trip turbine 1, upon the failure of shaft 2′ between the shaft pump 14 and turbine 1.

FIG. 3 shows a modification of the invention, wherein the additional speed-responsive device protecting the turbine against failure of the means transmitting torque to the normal speed responsive devices is electrical, rather than hydraulic. The same reference numbers are employed as in FIGS. 1 and 2 for like elements. The hydraulic tripping system is essentially the same. Pressure is maintained in line 7 by a pump 20 which supplies oil through the emergency governor dump valve 25 and dump valve 23.

The tripping mechanism for dump valve 23 is electrically controlled and is modified slightly as follows. A pivoted trip lever 48 is biased toward a tripping position by compression spring 49. Lever 48 is held in the position shown to prevent its tripping by means of the downward force of plunger 50 of an energized solenoid 51. Deenergization of solenoid 51 will allow spring 49 to pivot lever 48 clockwise. This trips dump valve 23, discharging oil from line 7 to close valves 3, 4.

A suitable source of electrical power for solenoid 51, indicated as battery 52, maintains solenoid 51 in an energized state when either of the parallel connected contacts 53 or 54 are closed by pivoted armature members 55, 56, respectively. The positions of armatures 55, 56, are controlled by polarized relay coils 57, 58, respectively. Increasing the voltage to polarized relays 57, 58, above a certain value, which can be preselected by means well known to those skilled in the art, causes the armatures to rotate clockwise. As shown, clockwise rotation of armatures 55 and 56 serve to close contacts 53 and to open contacts 54. Decrease of the applied voltage allows the armature 55 to rotate counterclockwise opening contacts 53. However, armature 56 is provided with a latching mechanism, diagrammatically illustrated by the hooked lever 59, which must be manually released before armature 56 can rotate counterclockwise to close contacts 54.

The coils of relays 57, 58, are supplied in parallel with current by a tachometer generator 60, mounted on the end of shaft 2′ to be rotated thereby. Generator 60 may have other functions as well as the one to be described herein, but is used in lieu of the shaft pump 14 of FIGS.

1 and 2. The voltage of the tachometer generator 60 is proportional to speed. Hence, increase in speed serves to increase the voltage and current supplied to the coils of relay 57, 58. Each relay acts individually to rotate its armature arm 55 or 56 clockwise when its own polarization bias is exceeded. Relay 57 is set to act at a lower voltage level than relay 58. The relays are selected and adjusted so that relay 57 will act first to close contacts 53 at about 60% of rated turbine speed, for example, and thereafter relay 58 will act to open contacts 54 at about 75% rated turbine speed. Since at least one of the sets of contacts 53, 54, must be closed at all times to prevent solenoid 51 from becoming deenergized and tripping the turbine, it will be apparent that by first closing contacts 53 and then opening contacts 54 during acceleration, one set of contacts will be closed at all times as the turbine is increasing in speed.

Upon decrease in speed, however, due to the latching mechanism 59 preventing armature 56 from acting, contacts 54 are prevented from closing. Hence, when contacts 53 open, the dump valve 23 will be tripped and valves 3, 4 closed.

Thus, it will be apparent that the two polarized relays shown, in combination with the latching mechanism are equivalent to the abutment 41 acting in cooperation with the hinged extension 43 of lever 42 in FIGS. 1 and 2. That is, the tripping mechanism is disabled or made inoperative as the shaft increases in speed. Upon exceeding a predetermined speed, the tripping mechanism is thereafter made operative and will be actuated to close the steam valves as the shaft slows.

As before, emergency governor 26 and tachometer generator 60 are driven from the main shaft extension 2', but are located in such close proximity that failure of the shaft section between them is extremely unlikely. The arrangement, therefore, protects against overspeed which is not sensed due to failure of the main shaft 2' between the turbine and its protective speed-responsive devices.

It will be readily apparent, that the tachometer generator 60 could also be employed as a speed responsive device on an auxiliary shaft carrying the emergency speed governor, similar to shaft 9 of FIG. 1. In this case it would protect, not only against failure of the main shaft but also against failure of the gears coupling the main shaft to the auxiliary shaft.

Other devices for supplying a supplementary speed-responsive signal to shut down a prime mover when the device slows after the prime mover has come to a certain speed will become apparent to those skilled in the art. The use of the outlet pressure of a centrifugal pump, which is also performing other necessary functions, is a particularly simple way to derive such a signal. However, the invention does not exclude the use of additional speed-responsive devices especially used to perform this function, such as offcenter rings, mechanical governors, etc. Although the tachometer generator shown in FIG. 3 is also ordinarily used for other purposes as well, the invention does not preclude the use of a special tachometer generator intended solely to provide this additional protection.

While there has been shown what is considered to be the preferred embodiment of the invntion, other modifications will occur to those skilled in the art. It is, of course, intended to cover by the appended claims all such modifications as fall within the true spirit and scope of the invention.

What we claim as new and desire to secure by Letters Patent of the United States is:

1. In a prime mover system, the combination of:
 a rotatable shaft portion driven by the prime mover,
 first means responsive to the speed of the shaft portion arranged to shut down the prime mover when the shaft portion exceeds a first predetermined speed.
 second means responsive to the speed of the shaft portion arranged to shut down the prime mover when the shaft portion decelerates below a second predetermined speed lower than said first predetermined speed while decelerating, whereby the second means protects the prime mover against the possibility of the shaft portion being nonresponsive to the speed of the prime mover.

2. In a prime mover system having a rotating shaft, the combination of:
 a shaft portion driven by said prime mover shaft,
 an emergency governor disposed on said shaft portion and including means to shut down said prime mover when a first predetermined speed is exceeded by the shaft portion,
 speed responsive means also disposed on the shaft portion and including means for shutting down the prime mover when the shaft portion decelerates below a second predetermined speed which is lower than said first speed, and,
 means preventing said speed responsive means from shutting down the prime mover until the shaft portion reaches a speed greater than said second predetermined speed.

3. The combination according to claim 2, wherein said shaft portion is a separate auxiliary shaft mechanically coupled to said prime mover rotating shaft.

4. In a prime mover system having a rotating shaft, the combination of:
 a shaft portion connected to said prime mover shaft to be rotated thereby,
 an emergency governor disposed on said shaft portion and including means to shut down said prime mover when a first predetermined speed is exceeded by the shaft portion,
 pump means driven by the shaft portion, said pump means including an outlet conduit in which the pressure varies as a function of the speed of the shaft portion, and
 pressure-responsive means connected to said pump outlet conduit and constructed and arranged to shut down the prime mover when the pressure in the pump conduit decreases after it has first risen to a predetermined value.

5. The combination according to claim 4 wherein said shaft portion is a separate auxiliary shaft connected to the prime mover shaft by a plurality of gears.

6. In a prime mover system having a rotating shaft, the combination of:
 a shaft portion connected to said prime mover shaft so as to be rotated thereby,
 an emergency governor disposed on said shaft portion and including means to shut down said prime mover when a first predetermined speed is exceeded by the shaft portion,
 electrical generator means driven by said shaft portion and furnishing a voltage which varies as a function of the speed of the shaft portion, and
 electrical relay means connected to said generator and including means to shut down the prime mover when the generator voltage decreases after it has first risen to a predetermined value.

7. The combination according to claim 6 wherein said shaft portion is a separate auxiliary shaft driven by the prime mover shaft through a plurality of gears.

8. In a prime mover system having a rotatably journaled main output shaft, the combination of:
 a rotatably journaled auxiliary shaft,
 gear means mechanically coupling the prime mover shaft to the auxiliary shaft,
 an emergency governor disposed on said auxiliary shaft, including means to shut down the prime mover when the auxiliary shaft exceeds a first predetermined speed,
 a centrifugal pump also disposed on said auxiliary shaft and having an outlet conduit in which the pressure varies as a function of the speed of the auxiliary shaft,
 pressure-responsive means connected to said pump outlet conduit and including a movable member which assumes various positions in response to the pump pressure, and means for shutting down said prime mover, said means including a hydraulic dump valve with a trip lever constructed to be actuated by said movable member as the pump discharge pressure decreases after it has first increased to a predetermined value representative of a second predetermined prime mover speed which is lower than said first speed.

References Cited by the Examiner
UNITED STATES PATENTS

| | | | |
|---|---|---|---|
| 1,902,340 | 3/33 | Schmidt | 137—36 |
| 2,658,484 | 11/53 | Kenney | 137—31 X |
| 2,894,521 | 7/59 | Carleton et al. | 137—31 |
| 2,916,635 | 12/59 | Nicita. | |
| 3,094,041 | 6/63 | Wagner | 137—36 X |

SAMUEL BERNSTEIN, *Primary Examiner.*